United States Patent [19]
Moore

[11] Patent Number: 4,649,899
[45] Date of Patent: Mar. 17, 1987

[54] SOLAR TRACKER

[76] Inventor: Roy A. Moore, Rte. 1, Box 637-C1, Jacksonville, Ala. 36265

[21] Appl. No.: 758,422

[22] Filed: Jul. 24, 1985

[51] Int. Cl.$^4$ .................................................. F24J 3/02
[52] U.S. Cl. .................................. 126/425; 126/424; 250/203 R
[58] Field of Search .................. 126/425, 424, 417; 250/203 R

[56] References Cited

U.S. PATENT DOCUMENTS

| | | | |
|---|---|---|---|
| 4,068,653 | 1/1978 | Bourdon et al. | 126/425 |
| 4,179,612 | 12/1979 | Smith | 126/425 X |
| 4,203,426 | 5/1980 | Matlock et al. | 126/425 |
| 4,225,781 | 9/1980 | Hammons | 126/425 X |
| 4,316,084 | 2/1982 | Stout | 126/425 X |
| 4,495,408 | 1/1985 | Mori | 126/425 X |

Primary Examiner—Larry Jones
Attorney, Agent, or Firm—Jennings, Carter, Thompson & Veal

[57] ABSTRACT

Apparatus for tracking the apparent motion of the sun utilizes a plurality of solar cells to generate an electrical signal when exposed to solar radiation. The solar cells are mounted inside a plurality of trough-like shadow boxes which permit exposure of the solar cells to solar radiation only at predetermined angles. The shadow boxes are mounted for concomitant rotation about a vertical and a horizontal axis and are driven by a pair of reversible motors. The motors are controlled by the output of the solar cells and reposition the shadow boxes to shade the solar cells responsive to the apparent motion of the sun.

12 Claims, 3 Drawing Figures

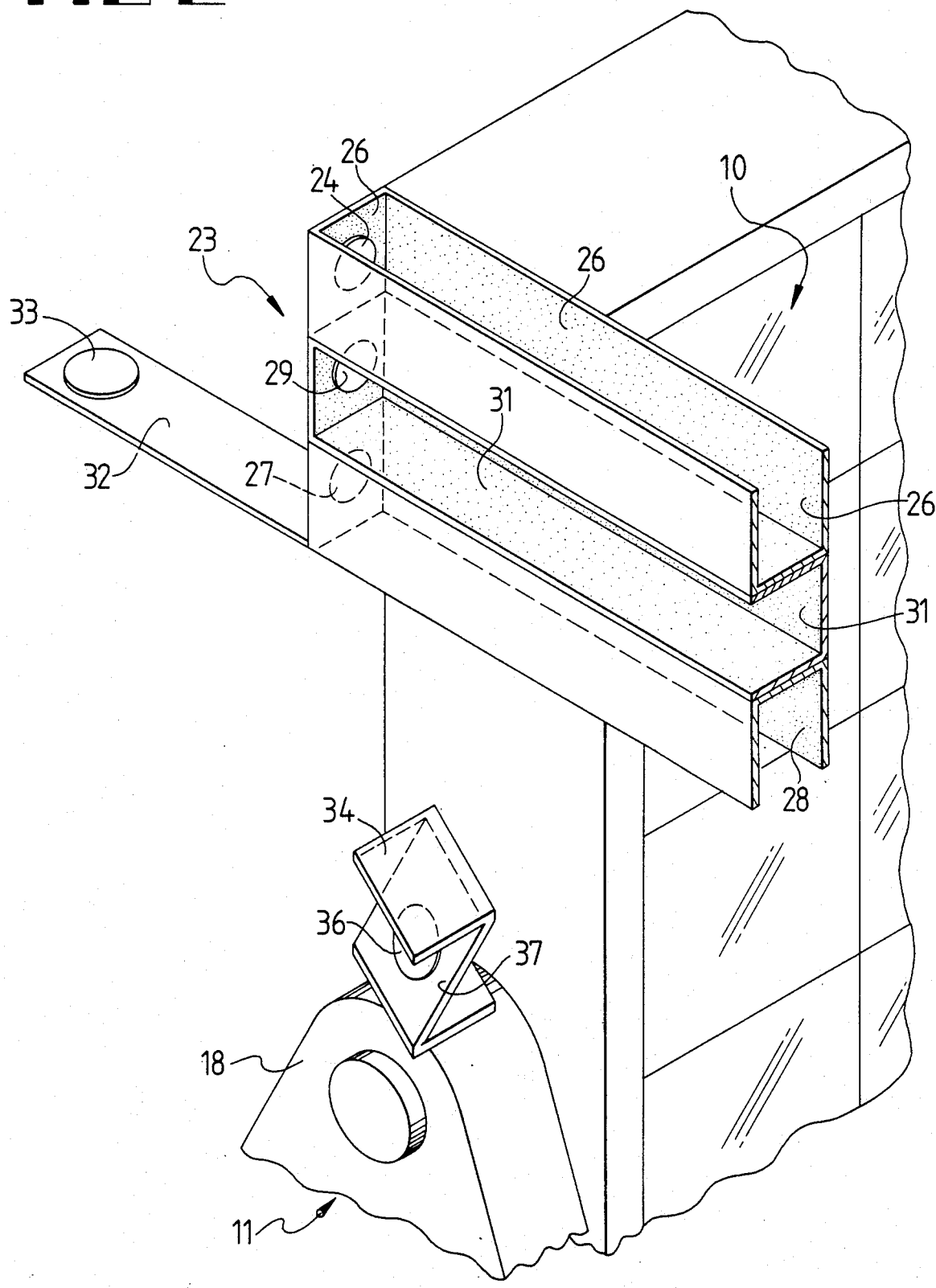

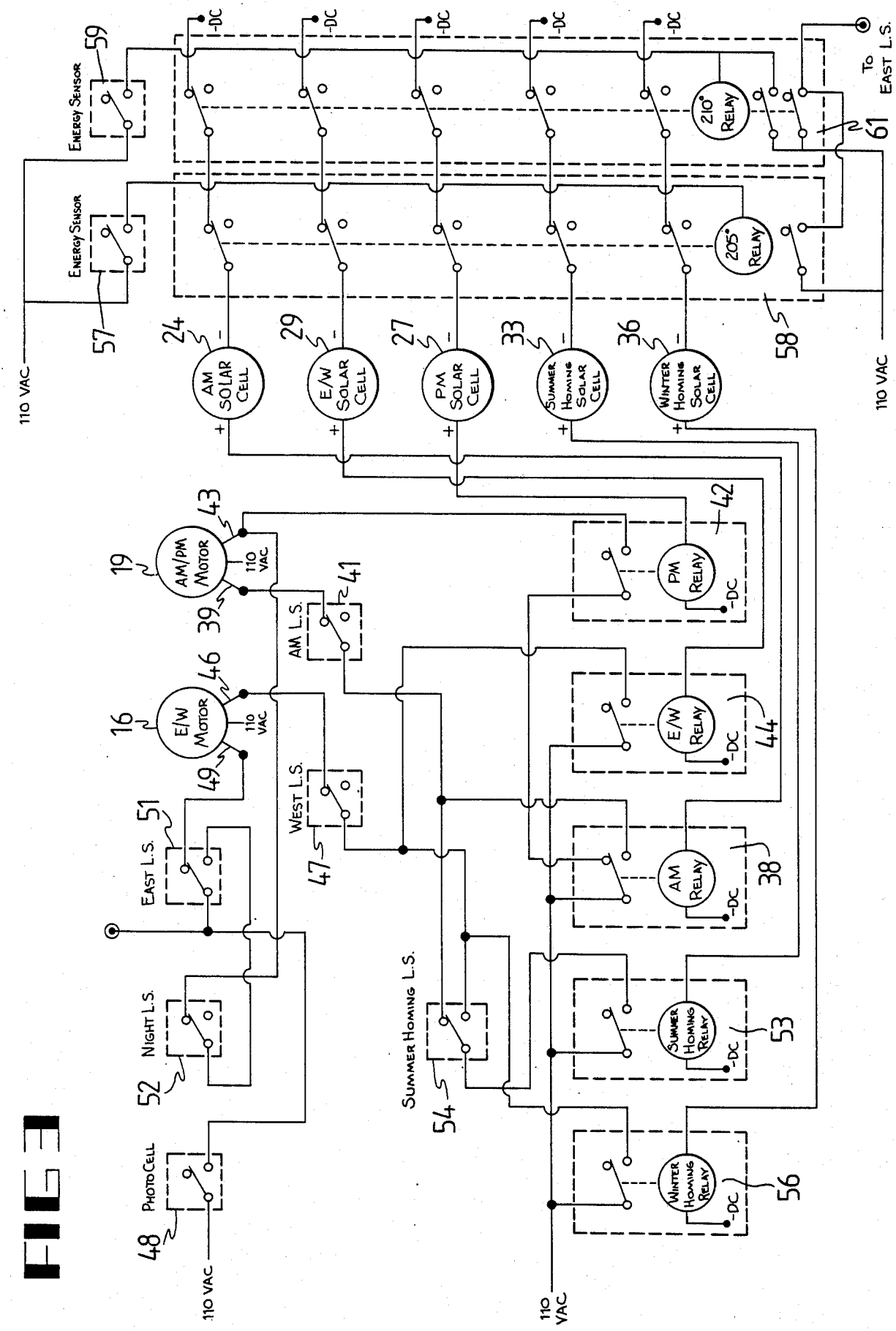

SOLAR TRACKER

FIELD OF THE INVENTION

The present invention relates to solar energy and more particularly to apparatus for tracking the sun. Even more particularly the present invention relates to electromechanical apparatus utilizing solar cells to track the sun at all variations of azimuth and elevation.

BACKGROUND OF THE INVENTION

It is well known that massive amounts of energy are transmitted to the earth from the sun; however the vast majority of this solar radiant energy is not converted into useable energy to meet the demands for human consumption of energy. A number of types of solar collectors are used to cover an area exposed to sunlight and convert the incident radiant energy into a useful form of energy such as heat or electricity. There are also systems which track the sun as the earth rotates. The more complex of these utilize sophisticated mathematical formulaes to predict the sun's apparent course and to track the sun. It has also been recognized that stationary solar collectors, particularly flat panel collectors commonly used for heating water, do not convert radiant energy to useful energy with the requisite efficiency to replace conventional sources of energy because the angle of incidence of the solar radiation deviates from normal to the surface of the solar collectors for most of each day. To increase the efficiency of such a system, a solar tracker can be used to orient the surface of the collector towards the sun; however, the known trackers are too complex and costly and leave something to be desired in terms of accuracy to be useful for most solar energy applications.

SUMMARY OF THE INVENTION

It is the object of my invention to provide an accurate solar tracker which is simple and economical in its construction and operation.

Another object of the invention is to provide a solar tracker which will align itself with the sun at any time regardless of the sun's azimuth and elevation.

Yet another object of the invention is to provide a tracker which disables itself in the event of excess energy accumulation.

My solar tracker accomplishes these and other objectives through the use of a plurality of solar cells which generate an electric current responsive to sunlight. The solar cells are normally shaded from sunlight by a housing; however as the apparent position of the sun proceeds across the sky one or more of the cells is exposed to sunlight. The electrical output of the exposed cells actuates one or more relays which energize a pair of electric motors. The electric motors move the housing about a vertical and a horizontal axis to shade the solar cells from the sun, thereby aligning the housing with the sun in azimuth and elevation. A solar collector may be affixed to the housing for concomitant motion therewith whereby the collector is continuously aligned with the sun. A photocell energizes the motors at night to return the housing to its initial position to await the sunrise.

DESCRIPTION OF THE DRAWINGS

Apparatus incorporating features of my invention are shown in the accompanying drawings which form a portion of this application wherein:

FIG. 2 is a sectional view of the tracker housing showing the solar cells; and

FIG. 3 is a schematic block diagram of the tracker circuitry.

DESCRIPTION OF A PREFERRED EMBODIMENT

Figure 1:
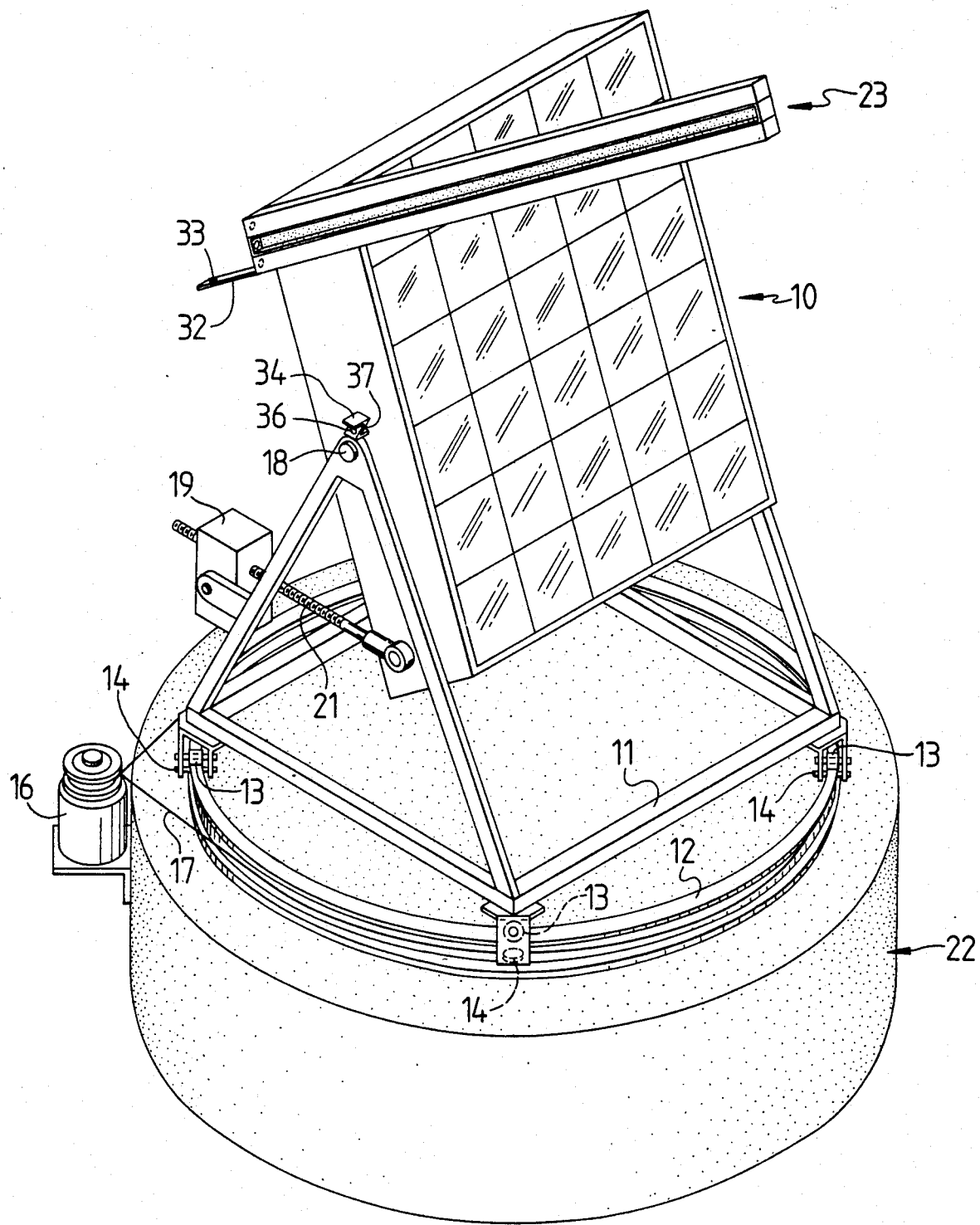
FIG. 1 is a perspective view of a solar collector mounted for movement and showing the tracker attached.

To achieve its maximum efficiency a solar collector must face directly towards the sun, such that the solar radiation is essentially normal to the plane of the collector. To accomplish this the collector must rotate about a vertical axis so that it moves from an eastwardly facing position at sunrise to a westwardly facing position at sunset and also must rotate about a horizontal axis to match the elevation of the sun as it varies from morning to noon to night. Referring to FIG. 1, it may be seen that the required movement can be readily accomplished by mounting a solar collector 10, shown as a flat plate although another type collector may be used, on a carriage 11 for rotational movement on a circular track 12. The track 12 may be of an I-beam construction, as viewed in cross section, such that carriage 11 is maintained in rolling engagement thereon by rollers 13 and cam followers 14. The carriage is driven about a vertical axis by an electrical, reversible motor 16 operably connected to the carriage as by a cable loop 17.

The carriage 11 is preferably A-shaped and supports the collector 10 for rotation about a horizontal axis at the apex 18 of the carriage 11. A second electric reversible motor 19, operatively connected to a threaded drive member 21, varies the elevation of the collector 10 and also provides improved stability in positioning the collector 10. The collector 10, carriage 11, and track 12 may be mounted on a platform 22 which may house a storage tank when the collector is used to heat a fluid. In such an instance the plumbing to and from the collector 10 is accomplished in a conventional manner and is not germane to the invention features of the present invention.

As shown in FIGS. 1 and 2, tracker assembly 23 is affixed to the collector 10 for concomitant movement therewith on said track 12 and carriage 11. The assembly 23 includes an AM solar cell 24 which is mounted at one end of an upwardly opening trough-like shadow box 26, a PM solar cell 27 mounted at one end of a similar downwardly opening shadow box 28, and an east/west solar cell 29 mounted at one end of a laterally opening shadow box 31. The shadow boxes 26, 28 and 31, which are closed at both ends, are parallel to one another although it is not necessary that the shadow boxes be contiguous. An extension 32 of the assembly 23 carries a summer homing solar cell 33. A Z-shaped bracket 34 carries a winter homing solar cell 36 and is mounted on the carriage 11 for movement therewith about the vertical axis, although the bracket 34 does not rotate with the collector 10 about the horizontal axis at the apex 18. The Z-shape of the bracket shades the solar cell 36, which is mounted on the upright portion 37 of the bracket 34, when the sun's elevation is about 50°. The bracket 34 is mounted so that the upright portion 36 is offset 30° in azimuth from the longitudinal axis of the shadow boxes.

Each solar cell 24, 27, 29, 33 and 36 has an electrical output, responsive to sunlight, which is used to actuate an associated self-resetting relay. The relays each have a set of contacts in the current path to motors 16 or 19, as the case may be; thus the motors move the carriage 11 and collector 10 in responsive to solar radiation activating one or more of the solar cells. The AM solar cell 24 is mounted within the shadow box 26 at the end proximal the collector 10. Each of the shadow boxes is about eight feet long. The shadow box 26 shades the solar cell 24 from direct sunlight except at certain angles of the sun relative to the shadow box 26. That is, the sun can shine on the solar cell 24 only when the sun's elevation exceeds the elevation of the shadow box 26 and the shadow box 26 has its longitudinal axis substantially aligned toward the sun. AM solar cell 24 is connected to an AM relay 38 shown in FIG. 3. The relay 38 is connected to a first input 39 of motor 19. When electrical current is supplied through the relay 38 to the first input 39, the motor 19 causes the collector 10 and tracking assembly 23 to increase in elevation. An AM limit switch 41 on the collector 10 and carriage 11 opens the current path between relay 38 and the motor 19 when the collector 10 has reached its maximum desired elevation.

The PM solar cell 27 is connected to and actuates a PM relay 42 which is in a current path to a second input 43 of motor 19. Since the PM shadow box 28 is downwardly opening, the PM solar cell 27 generates an electrical output only when the sun's elevation is below the elevation of the shadow box 28 and the collector 10. Current flow through the second input 43 causes the motor 19 to lower the collector 10 and tracking assembly 23 in elevation.

The east/west solar cell 29 is connected to actuate an east/west relay 44 which is in the current path to a west input 46 of the motor 16. Current flow through the west input causes motor 16 to turn the carriage clockwise as the sun moves from west to east. Inasmuch as the shadow box 31 associated with the east/west solar cell 29 is laterally opening the solar cell 29 is exposed to solar radiation only when the sun's azimuth is more westerly than that of the shadow box 31 and the collector 10. A west limit switch 47 opens the current path to the west input 46 when the carriage has reached a predetermined westerly rotation.

It is necessary to reset the collector 10 and tracking assembly 23 each night, thus a photo cell 48 is provided which acts as a switch to close a current path to an east input 49 of motor 16. Current flow via east input 49 causes the motor 16 to rotate te carriage counter-clockwise. An east limit switch 51 operably connected to the carriage 11 simultaneously opens the current path to the east input 49 and closes the current path to the second input 43 of motor 19 when the carriage 11 reaches a predetermined eastern alignment. A night limit switch 52 on collector 10 opens this current path to the second input 43 when the collector 10 and tracking assembly 23 reach a predetermined elevation.

Weather conditions may obscure the sun during a portion of the day and consequently the collector 10 and tracker assembly 23 will not be properly aligned with the sun. To accommodate this condition homing solar cells 33 and 36 are positioned to direct the repositioning of the collector 10 when the sun reemerges. Summer homing solar cell 33 is positioned on extension 32 for concomitant motion with the collector 10 and is normally shaded by the collector 10 or the tracking assembly 23. The sollar cell 33 is connected to a summer homing relay 53 which is in a current path to AM limit switch 41. A homing limit switch 54 opens this current path and closes a current path to west limit switch 47 when the collector has reached a predetermined elevation.

The winter homing solar cell 36 is mounted on the Z-bracket 34 such that it is shaded from sunlight except when the sun is below 50° in elevation and is more than 30° westwardly of the tracking assembly 23 in azimuth. In actual practice the azimuthal difference exceeds 30° and is nearer to 60° inasmuch as the angle of incidence of the solar radiation on the solar cell 36 must be 30° or greater to produce a useful electrical output. The solar cell 36 is connected to actuate a winter homing relay 56 which completes a current path to west limit switch 47.

Inasmuch as the collector 10 will be operating at a high efficiency, it may be possible for the collector to absorb an excess amount of energy. To counteract this a sensor 57 is positioned on the collector or remotely as at the storage tank to detect the accumulation of energy in excess of a predetermined level. The sensor 57 is connected to and actuates a relay 58 which has a plurality of ganged contacts. This relay 58 opens the current path from each solar cell to its associated relay and closes a current path to the east limit switch 51. A sensor sensor 59 is provided to detect even higher accumulations of energy or an overload of energy and is connected to a relay 61 which maintains itself in an actuated condition once triggered. This relay 61 also disables the solar cells and closes a current path to the east limit switch 51.

In operation, the collector 10 and tracker assembly 23 are aligned in azimuth and elevation to a predetermined initial position which corresponds to the actuation position of east limit switch 51 and night limit switch 52, and is calculated to provide alignment with the sun shortly after sunrise. This initial position is normally set to correspond to the azimuth of the sunrise on the summer solstice. As the sun makes its apparent ascent solar radiation falls on the AM solar cell 24 and the east/west solar cell 29. The sensitivity of the solar cells are selected to require a minimum BTU transfer to the collector before the tracking assembly will become operational to avoid spurious tracking in diffuse lighting on hazy days. When adequate sunlight is available the solar cells will generate a useful electrical output when about one-fourth to one-half of their surface area is exposed to direct solar radiation. Thus, as the sun appears to move it radiates these solar cells causing the solar cells to actuate their respective relays and energize the motors 16 and 19. The motors, in turn, rotate the collector 10 and tracking assembly 23 about the system's vertical and horizontal axis until the solar cells are again shaded. The tracking assembly 23 is affixed to the collector 10 such that shading of the solar cells aligns the surface of the collector 10 perpendicular to the incident solar radiation. During normal morning tracking the PM solar cell 27, mounted inside the downwardly opening shadow box 28, is shaded. The AM limit switch 41 opens the current path to the first input 39 of motor 19 to prevent the collector from being elevated beyond a predetermined angle by motor 19. As the sun passes its zenith and descends, elevational tracking is performed by the PM solar cell 27 and shadow box 28, and the AM solar cell 24 is shaded.

After a period of obscuration, during which none of the solar cells generates a useable output, either the summer homing solar cell 33 or the winter homing solar cell 36 will become sufficiently exposed to the sun to close its associated relay. The summer homing solar cell first actuates the elevating motor 19. If the sun has not progressed more than 60° in azimuth during the obscuration, the elevation of the east/west shadow box 31 by motor 19 will expose the east/west solar cell and it will close its associated relay 44 to drive the motor 16. If the east/west solar cell is not sufficiently exposed by the elevation of the collector 10, then at a predetermined elevation the homing limit switch 54 opens the current path from the summer homing relay 53 to the motor 19 and closes the current path to the motor 16 which moves the collector westwardly in azimuth to expose solar cell 29 and either solar cell 24 or 27 for normal tracking. The winter homing solar cell 36 will actuate the motor 16 to move the collector westwardly in azimuth until the east/west solar cell 29 is energized at which point the winter solar cell is insufficiently exposed. Since the elevation of the sun is much less in the winter than in the summer, the solar tracking of either AM solar cell 24 or PM solar cell 27 will be self-correcting once the tracker assembly 23 is properly aligned in azimuth.

While I have shown my invention in but one form, it will be obvious to those skilled in the art that it is not so limited, but is susceptible of various changes and modifications without departing from the spirit thereof.

What I claim is:

1. Apparatus for tracking the sun for use with a solar energy collector supported by a movable carriage having an initial position, comprising in combination:
   (a) first solar cell responsive to sunlight for generating a first electrical output;
   (b) first elongated trough-like member for blocking sunlight at selected angles from said first solar cell for generating an electrical output operably affixed to said collector for movement concomitantly therewith with said trough-like member having one end thereof open and having said first solar cell mounted at one end thereof;
   (c) second solar cell responsive to sunlight for generating a second electrical output;
   (d) second elongated trough-like member for blocking sunlight at selected angles from said second solar cell for generating an electrical output cooperatively affixed to said collector for concomitant motion therewith with said second trough-like member having one side thereof open with said open side facing opposite the open side of said first trough-like member;
   (e) means for varying the inclination of said collector with respect to a vertical plane responsive to said electrical output comprising:
      (i) a reversible electric motor operably connected to said collector having a first input whereby said motor is driven in a first direction and a second input whereby said motor is driven in a reverse direction;
      (ii) a first self-resetting relay operably connected to said first solar cell for generating an output and actuated thereby to provide a current path to said first input; and
      (iii) a second self-resetting relay operably connected to said second solar cell and actuated thereby to provide a current path to said second input, whereby said collector is progressively inclined away from said plane responsive to said first output as the sun increases in elevation and is progressively inclined toward said plane responsive to said second output as the sun decreases in elevation;
   (f) third solar cell responsive to sunlight for generating a third electrical output;
   (g) third elongated trough-like member for blocking sunlight at selected angles from said third solar cell for generating an electrical output affixed to said collector for concomitant motion therewith with said third trough-like member having one side thereof open with said open side facing perpendicular to the open side of said first and second trough-like members;
   (h) means for turning said carriage responsive to said third electrical output whereby said collector is turned in accordance with the sun's azimuth; and
   (i) reset circuit means responsive to the absence of light for causing said means for varying the inclination of said collector and said means for turning said carriage to return said collector and carriage to said initial position.

2. Apparatus as defined in claim 1 wherein said means for turning said carriage comprises:
   (a) a second reversible electrical motor operably connected to said carriage for rotating said carriage about a vertical axis; and
   (b) a third self-resetting relay operably connected to said third means for generating an output and actuated thereby to provide a current path to said motor for rotation of said carriage in a westerly direction.

3. Apparatus as defined in claim 2 wherein said reset circuit means comprises:
   (a) a photo cell switch responsive to an absence of light adapted to provide a current path to said second reversible motor for rotation of said carriage in an easterly direction;
   (b) an east limit switch mounted to said carriage and operably connected to said photo cell switch, and having a normally closed contact operably connected to said second reversible motor and a normally open contact connected to said second input of said first reversible motor, with said limit switch adapted for actuation at a predetermined position of said carriage; and
   (c) a night limit switch operably connected between said normally open contact of said carriage limit switch and said second input of said first reversible motor and adapted to interrupt current to said motor when said collector reaches a predetermined angular position.

4. Apparatus as defined in claim 2 further comprising:
   (a) an AM limit switch operably connected between said first relay and said first input to said first motor and adapted to interrupt current therebetween when said collector reaches a predetermined inclination; and
   (b) a west limit switch operably connected between said third relay and said second motor and adapted to interrupt current therebetween when said carriage has rotated to a predetermined position.

5. Apparatus as defined in claim 2 further comprising:
   (a) a summer homing solar cell positioned on said collector for concomitant motion therewith and shaded from sunlight during normal tracking and exposed to sunlight when said collector is not properly aligned with the sun and having an electrical output responsive to sunlight;

(b) a fourth self-resetting relay operably connected to and actuated by the electrical output of said summer homing solar cell, and having a normally open contact with closes upon actuation to provide a current path to the first input of said first motor;

(c) a homing limit switch operably connected between said fourth relay and said first motor and positioned on said collector for actuation at a predetermined inclination of said collector, with said limit switch having a normally closed first contact connected to said first motor and a normally open contact connected to the first input of said second motor;

(d) a winter homing solar cell positioned on said carriage for concomitant motion therewith and adapted for actuation by sunlight only when the elevation of the sun is less than 50° and the azimuth of the sun is at least 60° west of the facing direction of the collector, and having an electrical output; and (e) a fifth self-resetting relay actuated by the output of said winter homing solar cell and having a normally open contact which closes upon actuation to provide a current path to said first input of said second motor.

6. Apparatus for tracking the sun for use with a solar energy collector supported by a movable carriage having an initial position, comprising in combination:

(a) first solar cell responsive to sunlight for generating a first electrical output;

(b) first elongated trough-like member for blocking sunlight is selected angles from said first solar cell for generating an electrical output operably affixed to said collector for movement concomitantly therewith with said trough-like member having one side thereof open and having said first solar cell mounted at one end thereof;

(c) second solar cell responsive to sunlight for generating a second electrical output;

(d) second elongated trough-like member for blocking sunlight at selected angles from said second solar cell for generating an electrical output cooperatively affixed to said collector for concomitant motion therewith with said second trough-like member having one side thereof open with said open side facing opposite the open side of said first trough-like member;

(e) means for varying the inclination of said collector with respect to a vertical plane responsive to said electrical output, whereby said collector is progressively inclined away from said plane responsive to said first output as the sun increases in elevation and is progressively inclined toward said plane responsive to said second output as the sun decreases in elevation;

(f) third solar cell responsive to sunlight for generating a third electrical output;

(g) third elongated trough-like member for blocking sunlight at selected angles from said third means for generating an electrical output affixed to said collector for concomitant motion therewith with said third trough-like member having one side thereof open with said open side facing perpendicular to the open side of said first and second trough-like members;

(h) means for turning said carriage responsive to said third electrical output whereby said collector is turned in accordance with the sun's azimuth comprising:

(i) a reversible electrical motor operably connected to said carriage for rotating said carriage about a vertical axis; and (ii) a self-resetting relay operably connected to said third solar cell and actuated thereby to provide a current path to said motor for rotation of said carriage in a westerly direction; and (i) reset circuit means responsive to the absence of light for causing said means for varying the inclination of said collector and said means for turning said carriage to return said collector and carriage to said initial position.

7. Apparatus for tracking the sun for use with a solar energy collector supported by a movable carriage having an initial position, comprising in combination:

(a) first solar cell responsive to sunlight for generating a first electrical output;

(b) first elongated trough-like member for blocking sunlight at selected angles from said first solar cell for generating an electrical output operably affixed to said collector for movement concomitantly therewith with said trough-like member having one side thereof open and having said first solar cell mounted at one end thereof;

(c) second solar cell responsive to sunlight for generating a second electrical output;

(d) second elongated trough-like member for blocking sunlight at selected angles from said second solar cell for generating an electrical output cooperatively affixed to said collector for concomitant motion therewith with said second trough-like member having one side thereof open with said open side facing opposite the open side of said first trough-like member;

(e) means for varying the inclination of said collector with respect to a vertical plane responsive to said electrical output, whereby said collector is progressively inclined away from said plane responsive to said first output as the sun increases in elevation and is progressively inclined toward said plane responsive to said second output as the sun decreases in elevation;

(f) third solar cell responsive to sunlight for generating a third electrical output;

(g) third elongated trough-like member for blocking sunlight at selected angles from said third solar cell for generating an electrical output affixed to said collector for concomitant motion therewith with said third trough-like member having one side thereof open with said open side facing perpendicular to the open side of said first and second trough-like members;

(h) means for turning said carriage responsive to said third electrical output whereby said collector is turned in accordance with the sun's azimuth;

(i) reset circuit means responsive to the absence of light for causing said means for varying the inclination of said collector and said means for turning said carriage to return said collector and carriage to said initial position; and (j) means for directing said collector toward the sun when sunlight has been obscured until the sun reaches an azimuth and elevation substantially removed from said initial position of said collector, said means for directing having an electrical output connected for selectively actuating said means for varying the inclination of said collector and said means for turning said carriage in accordance with the position of said collector relative to the sun.

8. Apparatus as defined in claim 7 further comprising overload circuit means for disabling said output generating means responsive to excess energy absorption whereby said collector ceases tracking the sun.

9. Apparatus as defined in claim 8 wherein said overload circuit means comprises:
   (a) self-resetting relay means having a normally closed set of contacts operably connected to said output generating means responsive to a first predetermined level of energy absorption to open said contacts and interrupt the path of said outputs and a second set of normally open contacts which close responsive to said first predetermined level of energy absorption to cause said means for turning said carriage to return said carriage to its initial position; and
   (b) non-resetting second relay means responsive to a second predetermined level of energy absorption having a set of normally closed contacts operably connected to normally enable said output generating means, a second set of normally open contacts operably connected to enable said reset circuit means responsive to said second predetermined level of energy absorption.

10. A solar tracking apparatus mounted for rotation about a vertical axis responsive to the azimuthal position of the sun and for rotation about a horizontal axis responsive to the elevation of the sun, comprising in combination:
   (a) a plurality of solar cells each having an electrical output responsive to direct sunlight;
   (b) a plurality of parallel elongated trough-like members each having one of said solar cells affixed thereto inside one end of said trough-like members with said trough-like members being mounted for concomitant movement with each other and aligned in azimuth and elevation to shadow the associated solar cell from sunlight at a predetermined initial position;
   (c) a first electric motor responsive the electrical output of one of said solar cells to rotate said plurality of trough-like members about said horizontal axis to reposition said members to shadow said one of said solar cells as the sun increases in elevation and responsive to the output of a second solar cell to rotate said plurality of members about said horizontal axis to reposition said members to shadow said second solar cell as the sun decreases in elevation;
   (d) a second electric motor responsive to the electrical output of a third solar cell to rotate said plurality of trough-like members about said vertical axis to reposition said members to shadow said third solar cell as the sun's azimuth moves from east to west;
   (e) resetting circuit means responsive to the absence of sunlight for controlling said first and second electric motors to move said members to said predetermined initial position; and
   (f) home circuit means responsive to sunlight for aligning said plurality of trough-like members with the sun when sunlight has been obscured until the sun reaches an azimuth and elevation substantially removed from the azimuth and elevation of said members with said homing circuit means comprising:
   (i) a summer homing solar cell mounted to said plurality of trough-like members for concomitant motion therewith, shadowed from sunlight when said members are aligned with the sun and having an electrical output responsive to sunlight;
   (ii) a summer relay actuated by said electrical output of said summer homing solar cell to complete a current path to said electric motors;
   (iii) a limit switch operably connected to said plurality of trough-like members and said current path and adapted to selectively complete said current path to said first electric motor or said second electric motor in accordance with the elevation of said members;
   (iv) a winter homing solar cell mounted for concomitant rotation about said vertical axis with said plurality of trough-like members and to generate an electrical output only when the sun is below 50° in elevation and greater than 60° in azimuth from said members; and
   (v) a winter relay actuated by the output of said second homing solar cell to provide a current path to said second electric motor.

11. A solar tracking apparatus for a movable solar collector mounted for rotation about a vertical axis responsive to the azimuthal position of the sun and for rotation about a horizontal axis responsive to the elevation of the sun, comprising in combination:
   (a) a plurality of solar cells each having an electrical output responsive to direct sunlight;
   (b) a plurality of parallel elongated trough-like members each affixed to said solar collector and each having one of said solar cells affixed thereto inside one end of said trough-like members with said trough-like members being mounted for concomitant movement with each other and aligned in azimuth and elevation to shadow the associated solar cell from sunlight at a predetermined initial position;
   (c) a first electric motor responsive the electrical output of one of said solar cells to rotate said plurality of trough-like members about said horizontal axis to reposition said members to shadow said one of said solar cells as the sun increases in elevation and responsive to the output of a second said solar cell to rotate said plurality of members about said horizontal axis to reposition said members to shadow said second said solar cell as the sun decreases in elevation;
   (d) a second electric motor responsive to the electrical output of a third said solar cell to rotate said plurality of trough-like members about said vertical axis to reposition said members to shadow said third solar cell as the sun's azimuth moves from east to west;
   (e) resetting circuit means responsive to the absence of sunlight for controlling said first and second electric motors to move said members to said predetermined initial position comprising:
   (i) a photo cell switch adapted to close in the absence of light to provide a current path to said electric motors;
   (ii) a first limit switch operably connected in said current path from said photo cell switch having a normally closed contact providing a current path to said second electric motor and a normally open contact providing a current path to said first electric motor and adapted to open said closed contact and close said open contact when said members are aligned in azimuth in said predetermined initial position; and (iii) a second limit switch operably connected in said current path from said normally open contact and having a normally closed contact providing a current path to said first electric motor, with said second limit switch adapted to open said contact when said members are aligned in elevation in said predetermined initial position;

(f) means for sensing an excess energy accumulation by said solar collector and having an output; and (g) means responsive to said output for interrupting the current path of the electrical output of said solar cells and for providing a current path to said first limit switch.

12. Apparatus as defined in claim 11 wherein:

(a) one said trough-like member associated with said one of said solar cells is upwardly opening;

(b) a second said trough associated with said second solar cell is downwardly opening; and (c) a third said trough associated with said third solar cell is laterally opening in the direction of azimuthal motion of the sun.

* * * * *